United States Patent [19]

Zwirn et al.

[11] 4,445,138

[45] Apr. 24, 1984

[54] REAL TIME DYNAMIC RANGE COMPRESSION FOR IMAGE ENHANCEMENT

[75] Inventors: Robert Zwirn; William D. Farwell, both of Los Angeles, Calif.

[73] Assignee: Hughes Aircraft Company, El Segundo, Calif.

[21] Appl. No.: 332,588

[22] Filed: Dec. 21, 1981

[51] Int. Cl.³ .............................................. H04N 5/14
[52] U.S. Cl. .................................... 358/166; 358/160; 358/169
[58] Field of Search ................. 358/166, 160, 169, 37; 340/722, 742, 793

[56] References Cited

U.S. PATENT DOCUMENTS

| | | | |
|---|---|---|---|
| 3,979,555 | 9/1976 | Opittek | 358/166 |
| 3,983,320 | 9/1976 | Ketcham | 358/166 |
| 4,214,271 | 7/1980 | Jones | 358/166 |
| 4,337,514 | 6/1982 | Favereau | 358/166 |
| 4,345,314 | 8/1982 | Melamud | 358/166 |
| 4,353,092 | 10/1982 | Bailey | 358/160 |

FOREIGN PATENT DOCUMENTS 19518 11/1980 European Pat. Off. ............ 358/166

*Primary Examiner*—Tommy P. Chin
*Attorney, Agent, or Firm*—Mark J. Meltzer; W. J. Bethurum; A. W. Karambelas

[57] ABSTRACT

Circuitry is disclosed which generates signals which may be applied to subsequent processing circuitry, such as a display device. Applied signals having a first predetermined number of intensity levels are transformed by the circuitry into signals having a smaller predetermined number of intensity levels suitable for application to the display device. A histogram representing the number of occurrences of each particular intensity level in the first predetermined set of intensity levels is generated. This histogram is analyzed, and a plurality of peak intensity levels are selected for application to the display device. Mapping signals are generated which are determinative of which subsets of the remaining intensity levels are mapped into particular ones of the selected peak intensity levels. The mapping signals are then utilized to transform applied signals received during a subsequent time period into signals having the selected peak intensity levels. Output signals are provided having the selected peak intensity levels to the display device. The circuitry preserves the gross statistics of the image scene by selecting the dominently populated intensity levels for display.

15 Claims, 3 Drawing Figures

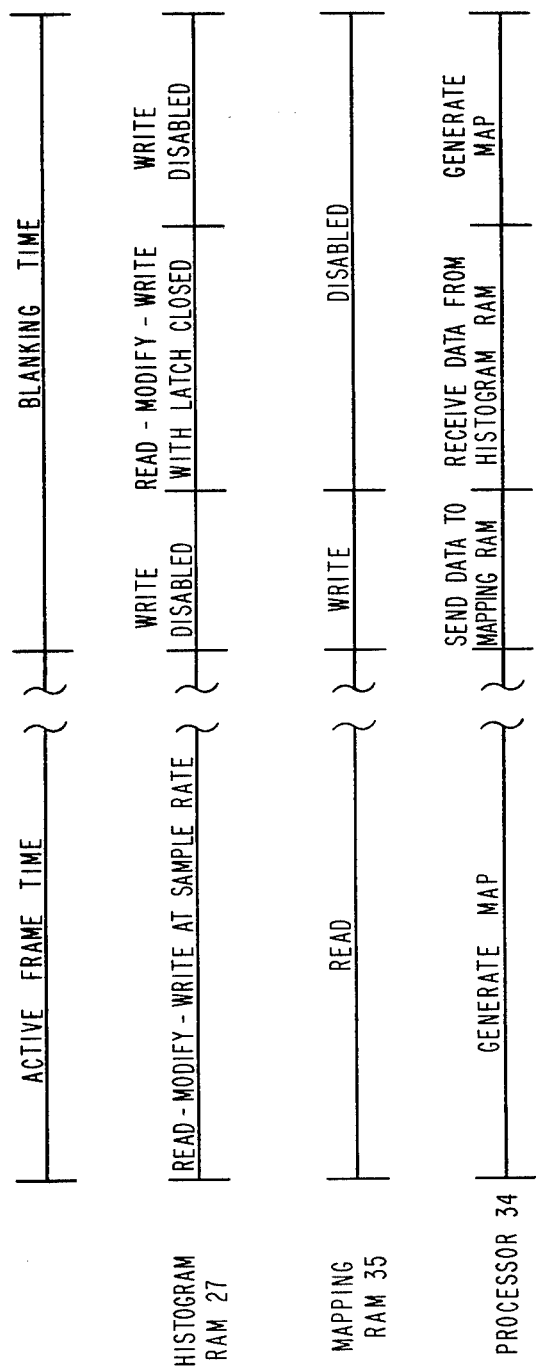

REAL TIME DYNAMIC RANGE COMPRESSION FOR IMAGE ENHANCEMENT

BACKGROUND

The present invention relates generally to image enhancement techniques and more particularly to image enhancement techniques which control the dynamic range of signals applied to a display device.

Present day imaging systems, such as thermal imaging systems and the like, generally employ a detector array which provides output signals in a video format. The output signals are processed and applied to a video display for viewing by an operator. As is typically the case, the detector array has a greater dynamic range than the video display. For example, a typical detector might provide output signals which are converted into 256 digitized output levels (shades of gray), while the video display can provide ten output levels (shades of gray). The selection of which output levels from the detector are applied to the video display has a great effect on the quality and clarity of the reproduced image.

Prior art image enhancement techniques have included scaling and histogram equalization. The scaling technique involves spreading of a portion of a scene's amplitude domain linearly over the video display's dynamic range, while allowing the remainder of amplitude domain to saturate. Histogram equalization involves the partitioning of the scene's amplitude domain into amplitude bands which are forced to have the same population distribution. Typical of histogram equalization techniques are those disclosed in U.S. Pat. No. 3,983,320, entitled "Raster Display Histogram Equalization", by Ketcham et al, and U.S. Pat. No. 3,979,555, entitled "Histogram Equalization System for Display Improvement", by Opittek et al.

The Ketcham et al patent discloses a device which performs a sliding window histogram equalization of a television image in real time. This invention computes selected local areas and the histogram is utilized to modify the center or near center elements of the area from which the histogram was computed. Thus, for example, the intensity of a particular point in the image is adjusted according to the histogram of the area contained within a window immediately surrounding the point to be equalized.

The Opittek et al patent discloses a histogram equalization system which utilizes a digital video integrator to address a random access memory. The memory accumulates statistics of the image scene during the addressing cycle. The memory is then read out with the word value accumulated for a portion of the memory equal to the total number of picture elements in the portion of the scene utilized to form the histogram, divided by the number of values which are to be truncated.

The word values determine truncation points which are stored in a latch circuit. The integrator is again read out into truncation logic circuitry which compares each video signal with the truncation point stored in the latching circuitry. Thus, truncated video with a reduced number of video bits is provided as an output. The redistributed intensity levels of the truncate video output have an equal number of picture elements at all intensity levels, resulting in an increase in detail in the region of high occurrence of picture elements.

However, none of the prior art systems is designed in a manner which preserves the gross statistics of the original image scene. The prior art systems generally equalize or manipulate the statistics as opposed to maintaning them.

Accordingly, it would be an improvement in the image processing art to have an image enhancement system which preserves the gross statistics of the image scene while providing an enhanced image.

SUMMARY OF THE INVENTION

The present invention provides for a real-time image enhancement system which redistributes the populations of the output levels of the image sensor prior to their application to subsequent processing devices, such as a video display device. This redistribution is done in the manner which preserves the gross statistics of the original image scene. The system selects dominantly populated output levels for display by the display device. The present invention provides for a system for use with a display device which processes applied signals having a first set of intensity values. The system may generally process applied signals comprising sequential fields of video signals, or other signals having a video-like format. The system provides output signals having a second set of intensity values to the display device, or the like. The first set of intensity values must be greater than the second set.

The system comprises histogram generation circuitry which generates a histogram indicative of the number of occurrences of signals at each intensity value in the first set received during a first time period. Processing circuitry, which may be a computer device, is coupled to the histogram generation circuitry. The processing circuitry selects the second set of intensity values from the histogram which correspond to those intensity values that occur more often than other intensity values. The processing circuitry also generates mapping signals which are determinative of the respective intensity values from the second set of intensity values to which subsets of the remaining intensity values are assigned. The mapping signals are determinative of which subsets of the first set of intensity values are mapped into selected ones of the second set of intensity values. Mapping circuitry is coupled to both the processing circuitry and display device for providing output signals to the display device. The output signals are provided to the display device during a second time period in response to applied signals received during the second time period. The output signals have the second set of intensity values, with the particular intensity values of each of the output signals being determined by the mapping signals.

Thus, for example, during a first video frame, a histogram is generated which is indicative of the number of occurrence of each intensity level during the frame. During the next succeeding video frame, the histogram data is analyzed to determine the second set of intensity values which represent the predominently populated values. Once the predominently populated values have been determined, the mapping signals are determined which are indicative of which subsets of the intensity values from the first set are mapped into the selected predominantly populated values. Each value in each of the subsets are assigned the corresponding intensity value of the second set associated therewith. Once the mapping signals have been determined, they are applied to and stored in the mapping circuitry. Then, during the second succeeding video frame, applied signals received during that frame cause the mapping signals stored in the mapping circuitry to be applied to the display device. Thus, each intensity value from the applied signals outputs a corresponding intensity value stored in the mapping circuitry, the particular output value being determined by the mapping signals stored therein.

In one particular embodiment, the processing circuitry selects the second set of intensity values which occur more often than other intensity values. In addition, the processing circuitry selects a third set of intensity values which occur least often than other intensity values from the histogram. The selected values are such that intensity values from the second set are interposed between intensity values from the third set. The mapping signals generated by the processing circuitry are such that all intensity values between adjacent values from the third set are mapped into the intensity value from the second set interposed therebetween.

In a preferred embodiment, the histogram generation circuitry comprises a first random access memory having a data input, a data output and an address input. The address input is utilized to receive the applied signals. The data output is coupled to an accumulator which increments the signals provided by the first random access memory by a predetermined value (one) and returns the incremented signals to the first random access memory by means of the data input for storage. The first random access memory also has its data output coupled to the processor circuitry for transferring the histogram data stored therein.

Each memory location in the first random access memory corresponds to a particular input signal intensity level. Each intensity level is a digital word which is applied to the address lines of the first memory. Each time a particular address is accessed, the data stored in the corresponding memory location is read out, incremented by one, and returned to the first memory for storage.

The accumulator may generally comprise an adder having on input coupled to the data output of the first random access memory and having another input coupled to a signal source which provides the incrementing value. In addition, a latch may be coupled between the output of the adder and the data input of the first random access memory in order to ensure proper storage of the incremented value in the first memory.

The mapping circuitry may also be comprised of a second random access memory having a data input, a data output and an address input. The data input is coupled to the processing circuitry for receiving the mapping signals and storing them therein. The applied signals are received at the address input of the second random access memory and the data output is coupled to the display device.

Each memory location in the second random access memory has a particular mapping signal loaded therein as determined by the processing circuitry. Each intensity level of the applied signals addresses a particular memory location in the second memory. The data stored in each memory location (the mapping signals) is read out each time the corresponding address line is activated by the associated intensity value of the applied signals.

In operation, and utilizing the specific embodiment described above, applied signals, which may generally be in a digital form, are received at the address input of the first random access memory comprising the histogram generation circuitry. The first memory is initially loaded with zeros. Each intensity level of the applied signals corresponds to a particular address location in the first random access memory. Each time a signal is received during a particular input level, the word in the first memory identified by the particular address location is provided as an output signal to the accumulator. The accumulator increments the value of the word by one and returns it to the memory location in the first random access memory. Accordingly, the operation of the first random access memory and accumulator generates a histogram identifying the number of occurrences of each intensity level received during the first time period.

At the end of the first time period, the contents of the first random access memory are loaded into the processing circuitry which analyzes the data in order to generate the mapping signals. The processing circuitry determines a predetermined number of intensity levels which have the greatest number of occurrences. These values correspond to peaks in the histogram. In addition, the processing circuitry determines intensity values which occur least often than the other intensity values in the histogram. These intensity values correspond to the valleys interposed between adjacent peaks in the histogram.

Once the peaks and valleys have been identified, the processing circuitry generates the mapping signals. For example, the set of mapping signals may be such that all values between adjacent valleys are mapped into the peak interposed therebetween. The mapping signals are in the form of words which are loaded into the second random access memory comprising the mapping circuitry. Accordingly, the mapping circuitry is loaded with the second set of intensity values which identify the peaks in the histogram.

During the second time period, applied signals received by the second random access memory comprising the mapping circuitry are received at the address input thereof. Each time a particular intensity value of the applied signals is received at the address input, a word corresponding to the addressed memory location is provided as an output signal. This memory location has the intensity value determined by the processing circuitry stored therein. The output signals are provided to the display device, and comprise the second predetermined set of intensity values.

The peaks (second set of intensity values) correspond to the predominently populated intensity levels from the applies signals. These predominantly populated levels are selected for display at the display device. Hence, the original gross statistics, as represented by the predominently populated intensity levels, are preserved by selecting them for display.

The present invention is thus capable of transforming applied signals having a large dynamic range into output signals used to drive a display device which responds to signals having a substantially lower dynamic range. The invention preserves the gross statistics of the applied signals by mapping neighboring intensity levels into the predominately populated intensity levels for display by the display device.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates a timing diagram for the circuit of FIG. 1.

DETAILED DESCRIPTION

Figure 1:
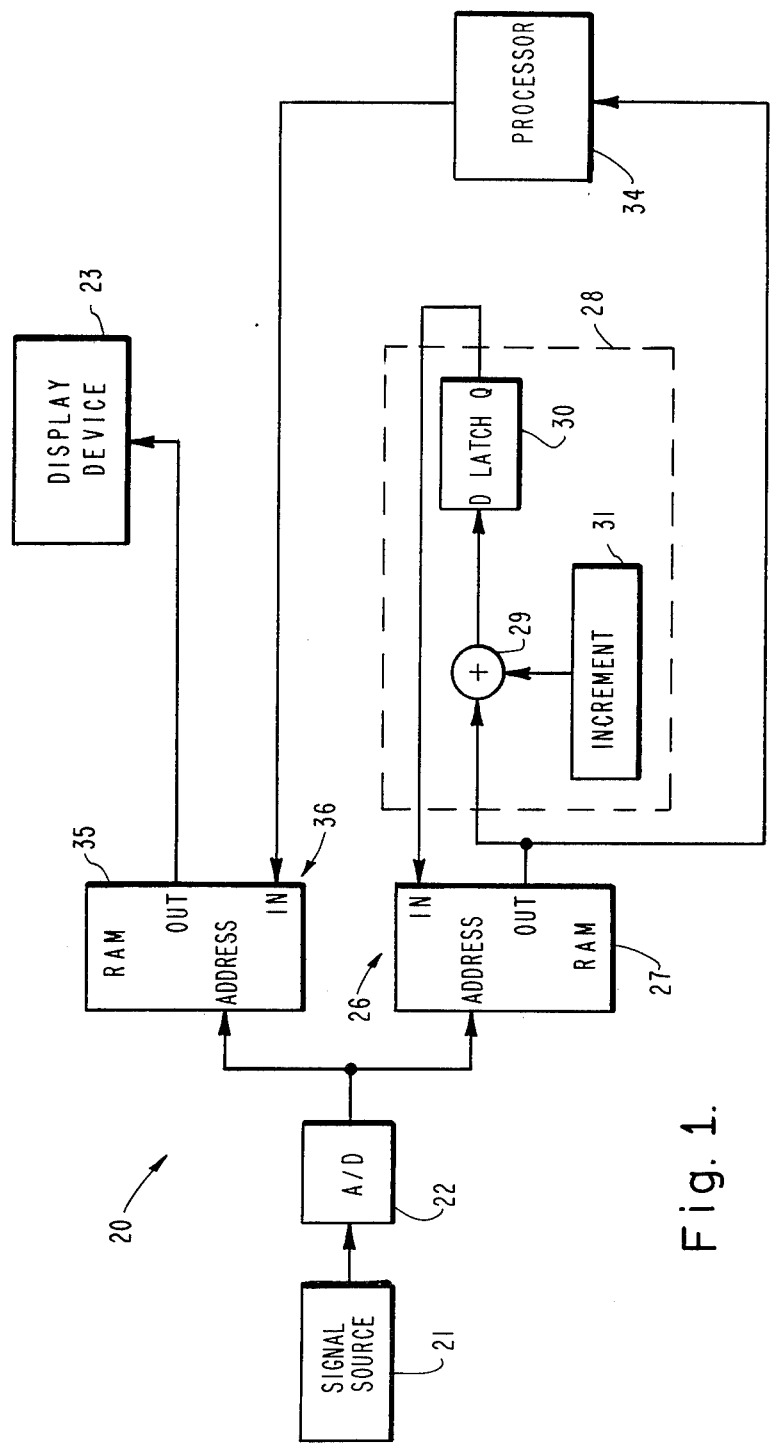
FIG. 1 illustrates an image enhancement circuit in accordance with the principles of the present invention.

Referring to FIG. 1 there is shown an image enhancement circuit 20 in accordance with the principles of the present invention. The image enhancement circuit 20 is utilized to process applied signals, which in this specific embodiment are digital signals. The digitized signals have a first predetermined range of intensity values (M levels), which are derived from a signal source 21 and digitized by means of an analog to digital (A/D) converter 22. The signal source 21 may be a video camera, infrared detector array, or other similar image sensing device. The display device 23 may be a conventional video display, containing a cathode-ray tube (CRT) device, or the like, is representative of a subsequent processing device which may utilize signals generated by the enhancement circuit 20.

The image enhancement circuit 20 comprises histogram generation circuitry 26 which includes a first random access memory 27 and an accumulator 28. The first random access memory 27 may be a model 93422 manufactured by Fairchild Semiconductor, Inc., or the like. The accumulator 28 comprises an adder 29 which receives output signals from the first memory 27 at one input thereof, and which receives incrementing signals derived from increment circuitry 31 at another input thereof. The adder 29 provides signals through latch circuitry 30 to the data input of the first memory 27. The applied digitized signals derived from the signal source 21 are applied to the address inputs of the first memory 27.

Output signals from the histogram generation circuitry 26 are taken from the data output thereof and are applied to an input of processing circuitry 34. The processing circuitry 34 may be a commonly available microprocessor, such as Model No. 8080, manufactured by Intel, Inc., or the like. The processing circuitry 34 is programmed by means of a user defined computer program that controls the manner in which the processor circuitry 34 analyzes the histogram data provided thereto.

Mapping circuitry 36 may be provided by a second random access memory 35, which may be substantially identical to the first memory 27. The mapping circuitry 36 is utilized to transform the applied digitized signals into output signals applied to the display device 23. The output signals from the mapping circuitry 36 have a second predetermined set of intensity values (N levels). The processing circuitry 34 loads mapping data generated thereby into the second random access memory 35 by means of its data input. The applied digitized signals derived from the signal source 21 are applied to the address input of the second random access memory 35. The data output of the second random access memory is coupled to the display device 23.

The operation of the image enhancement circuit 20 of FIG. 1 is described hereinbelow with reference to the use of video signals and a video display device. Thus, for example, the signal source 21 provides video output signals which are digitized by the analog to digital converter 22. These video signals may be derived from a detector array which has a dynamic range which far exceeds that of the display device 23. For example, a typical detector array may have approximately 256 output levels while the display device 23 may only display 10 levels (shades of gray).

The digitized video signals are applied to the addresss inputs (address lines) of the first random access memory 27. Each intensity level of the 256 possible intensity levels of the applied digitized video signals addresses a particular memory location in the first memory 27. Each time a particular intensity level is received at the address lines, the value stored in the memory location corresponding to that particular address is read out to the accumulator 28. The accumulator 28, by means of the adder 29, increments the memory word by one. The word is then returned to the first memory 27 and stored in the same address location.

Accordingly, the first memory 27 keeps a running total of the number of times a particular intensity level is received. This operation generates a histogram of the number of occurrences of a particular intensity level for all digitized video signals received during a predetermined time period. The histogram is typically generated for one video frame. As is generally well known in the video art, a video frame is comprised of active time and blanking time near the end of the frame. The histogram is generated during the active time, and the contents of the first memory 27 are read out to the processing circuitry 34 during the blanking time.

The processing circuitry 34 then executes a program stored therein upon receipt of the histogram data read out from the memory 27. This computational process is performed during the blanking time of the subsequent video frame. The processing circuitry 34 determines those intensity levels which are to be applied to the display device 23, and additionally determine which subset of the applied signals are mapped into particular ones of the intensity levels applied to the display device 23. The Appendix includes a typical BASIC program which may be run on a conventional computer to perform the computations described below. It is to be understood that use of a microprocessor, or the like, requires programming to be done in assembler language.

Figure 2:
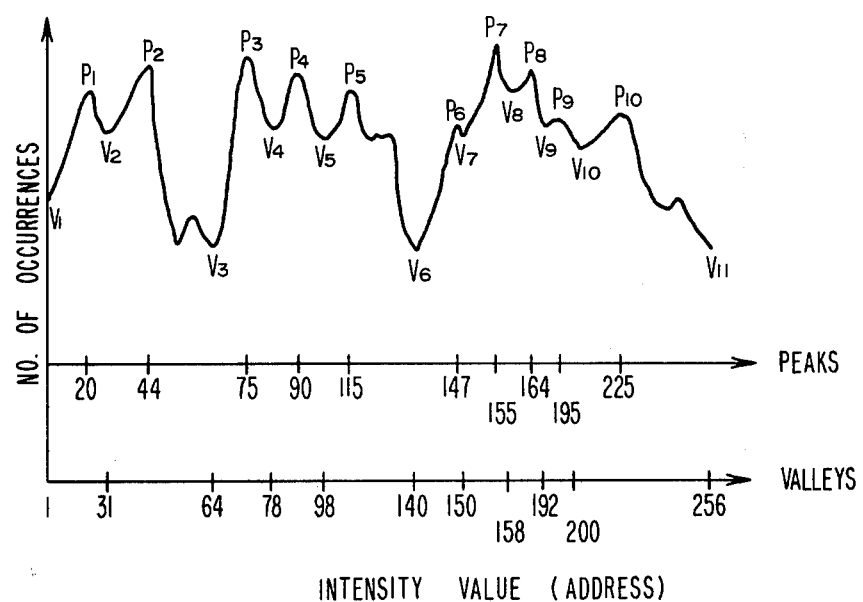
FIG. 2 is a histogram which is useful in explaining the operation of the circuit of FIG. 1.

FIG. 2 shows a graph of typical histogram data which might be received by the processing circuitry 34. FIG. 2 is useful in explaining one way in which the processing circuitry 34 generates the mapping signals. FIG. 2 illustrates a graph of the number of occurrences of a particular intensity level received during a video frame versus the intensity value (address). It is assumed that there are 256 possible intensity values present in the applied digitized signals received from the signal source 21. It is also assumed that the display device is a typical video display which is capable of recongnizing and reproducing 10 shades of gray.

The uppermost horizontal line of the graph identifies the 10 highest peaks (M levels) in the histogram. These peaks are those intensity values for which the number of occurrences have occurred most often during the particular video frame. The lower horizontal line indicate the valleys between adjacent peaks. The total number of valleys in this example is 11 (N+1 levels). These valleys correspond to the intensity values of the histogram which occur least often during the video frame. The valleys are chosen such that one peak intensity level is interposed between adjacent valleys. In particular, the first valley occurs at intensity level 1, the second valley at intensity level 31, and the first peak is at intensity level 20.

The mapping signals generated by the processing circuitry 34 are such that all intensity levels from intensity level 1 to intensity level 31 are mapped into intensity level 20. Similarly, all intensity levels from intensity level 31 to the third valley, intensity level 64, are mapped into intensity level 44, and so on for the remainder of the 256 intensity levels. The mapping signals are in the form of digitized words which are transferred and stored in the second random access memory 35 comprising the mapping circuitry 36. The mapping signals are loaded into the second memory during the blanking time of the second video frame.

The second memory 35 thus has each of its memory locations loaded with one of 10 different intensity values corresponding to the peaks indicated in FIG. 2. Each memory location corresponding to intensity levels 1 through 31 have an intensity value stored therein which is indicative of intensity level 20. Similarly, the memory locations corresponding to intensity levels 32 through 64 have a word stored therein which identifies intensity level 44, and so on for the remainder of the intensity values.

During the second subsequent video frame, digitized video signals received from the signal source 21 are received at the address lines of the second memory 35. Upon receipt of the signals, each memory location which is addressed by a particular intensity level of the applied signals causes one of the 10 peak intensity levels stored in the second memory 35 during the previous video frame to be applied to the display device 23. In this manner, the 256 intensity levels associated with the input video signals are transformed into output signals provided to the display device having 10 input levels. This transformation of intensity levels is done in a manner in which preserves the gross statistics of the applied signals, in that those intensity values which are predominate in the applied signals are reproduced at the display device 23.

It should be understood that the above-described operational steps performed by the various components take place simultaneously. The image enhancement circuit 20 operates on data received during three subsequent video frames. In summary, the histogram generation circuitry 26 gather statistics on the intensity values of the signals received during frame n. The processing circuitry 34 operates on the histogram data from frame n−1 during frame n to generate the mapping signals. The mapping circuitry 36 translates the 256 intensity levels into 10 output levels during frame n based on mapping signals generated from frame n−2 data.

During the blanking time of a particular frame n, the processing circuitry 34 sends new mapping signals to the mapping circuitry 36 based on frame n−1 data. The histogram generation circuitry 26 transfers the statistics gathered during frame n in the blanking time of frame n to the processing circuitry 34, and is thereafter reset in preparation for gathering new data on frame n+1.

These operations result in a continuous flow of data to the display device 23 during each video frame. The information applied to the display device 23 during a particular frame n is derived from signals received during frame n−2. Thus, there is a two frame delay between the receipt of the applied signals and application of signals to the display device based thereon.

For purposes of clarity, FIG. 3 shows the operations which take place in the various components of the image enhancement circuit 20 of FIG. 1 during a particular video frame. FIG. 3 is a typical timing diagram illustrated the timing and operational modes of the components of the circuit of FIG. 1 during a particular video frame.

Thus, there has been described a new and improved image enhancement circuit which operates in real time and which provides signals to a display device which preserves the gross statistics of signals derived from an image scene. It is to be understood that the above-described embodiment is merely illustrative of one of the many specific embodiments which represent applications of the principles of the present invention. Clearly, numerous and varied other arrangements may readily be devised by those skilled in the art without departing from the spirit and scope of the invention. For example, the mapping signals need not be obtained by mapping intensity levels from adjacent valleys into an intensity peak therebetween. Any suitable mapping scheme may be empolyed in which selected peak intensity levels (highly populated) are employed for display by the display device.

APPENDIX

```
10 REM        PROGRAM TO SMOOTH AND PICK PEAKS
              AND VALLEYS
20 REM
30 REM
40 REM        disk:13    side:2    11/30/1981    JLK
50 REM
60 REM
70 REM  Y(256),P(128),V(8),PK(10)
80 REM  Y=ARRAY FOR DATA
        P=ARRAY FOR PEAKS
        V=ARRAY FOR VALLEYS
90 REM  (ACTUAL DATA) (ADDRESSES) (ADDRESSES)
100 OPEN "R",#2,"YDATA",2
110 FIELD #2,2 AS Y$
120 REM       ENTER SAMPLE DATA
130 FOR I=1 TO 256
140 GET #2,I
150 Y(I)=CVI(Y$)
160 LPRINT USING "###";I;
170 LPRINT TAB(Y(I));Y(I)
180 NEXT I
190 GOTO 350
200 Y(240)=29
210 CLOSE #2
220 REM       PRINT DATA
230 LPRINT CHR$(12)
240 FOR I=1 TO 256
250 LPRINT USING "###";I;
260 LPRINT TAB(Y(I));Y(I)
270 NEXT I
280 REM       STORE DATA
290 OPEN "R",#2,"YDATA",2
300 FIELD #2,2 AS Y$
310 FOR I=1 TO 256
320 LSET Y$=MKI$(Y(I))
330 PUT #2,I
340 NEXT I
350 REM       LOOP TO FIND PEAKS
360 YY=Y(1)
370 B=1
380 N=0
390 IM=1
400 FOR I=2 TO 256
410 IF Y(I)=YY THEN GOTO 510
420 IF Y(I)<YY GOTO 460
430 B=1
440 IM=1
450 GOTO 500
460 IF 8=0 GOTO 500
470 N=N+1
480 P(N)=IM
490 B=0
500 YY=Y(I)
510 NEXT I
520 REM       TOP 10 PEAK Y-VALUES
```

APPENDIX-continued

```
530 FOR J=1 TO 10
540 YY=0
550 FOR I=1 TO N
560 IF P(I)=0 GOTO 610
570 IP=P(I)
580 IF Y(IP)<YY GOTO 610
590 YY=Y(IP)
600 HP=1
610 NEXT I
620 PK(J)=P(HP)
630 P(HP)=0
640 YY=0
650 NEXT J
660 FOR I=1 TO 10
670 P(I)=PK(I)
680 NEXT I
690 FOR JJ=1 TO 9
700 FOR I=1 TO 10-JJ
710 IF P(I)<P(I+1) GOTO 750
720 PT=P(I)
730 P(I)=P(I+1)
740 P(I+1)=PT
750 NEXT I
760 NEXT JJ
770 FOR I=1 TO 10
780 A=P(I)+1
790 B=P(I+1)-1
800 VI=Y(A)
810 FOR J=A TO B
820 IF Y(J)>VI THEN GOTO 850
830 VI=Y(J)
840 VI=J
850 NEXT J
860 NEXT I
870 FOR I=1 TO 10
880 LPRINT USING "##";I;
890 LPRINT USING "####";P(I);
900 LPRINT USING "####--";Y(P(I));
910 IF I>9 GOTO 940
920 LPRINT USING "####";V(I);
930 LPRINT USING "####";Y(V(I));
940 LPRINT
950 NEXT I
960 STOP
970 END
```

What is claimed is:

1. Apparatus which processes applied signals having a first set of intensity values and provides output signals having a second set of intensity values, said first set being greater than said second set, said apparatus comprising:

histogram generation means for generating a histogram indicative of the number of occurrences of first time period applied signals at each intensity value in said first set received during a first time period;

processing means coupled to said histogram generation means for selecting said second set of intensity values from said histogram which occur more often than other intensity values, and for generating mapping signals which are determination of said respectively selected intensity values from said second set of intensity values to which subsets of the remaining intensity values from said first set are assigned; and mapping means coupled to said processing means for providing said output signals during a second time period in response to second time period applied signals received during said second time period, said output signals having said second set of intensity values, the particular intensity value of each of said output signals being determined by said mapping signals.

2. The apparatus of claim 1 wherein said histogram generation means comprises:

a first random access memory having a data input, a data output, and an address input for receiving said first time period applied signals, said data output being coupled to said processing means; and accumulator means having an input coupled to the data output of said first random access memory, and having an output coupled to the data input of said first random access memory, for incrementing the signals provided by said first random access memory by a predetermined value and returning the incremented signals to said first random access memory for storage thereby.

3. The apparatus of claim 2 wherein said accumulator means comprises:

an adder having one input coupled to the data output of said first random access memory and having another input coupled to a signal source for providing said increment value; and a latch having an input coupled to an output of said adder, and having an output coupled to the data input of said first random access memory.

4. The apparatus of claims 1, 2 or 3 wherein said processing means comprises:

a computer processing device programmed so as to determine said second set of intensity levels and for providing said mapping signals to said mapping means.

5. The apparatus of claim 1 or 2 wherein said mapping means comprises:

a second random access memory having a data input, a data output and an address input for receiving said second time period applied signals, said processing means having an output coupled to said data input for providing said mapping signals thereto, said data output providing said output signals therefrom.

6. Apparatus for use with a display device which processes applied signals having a first set of intensity values and provides output signals having a second set of intensity values to said display device, said first set being greater than said second set, said apparatus comprising:

histogram generation means for generating a histogram indicative of the number of occurrences of first time period applied signals at each intensity value in said first set received during a first time period;

processing means coupled to said histogram generation means for selecting said second set of intensity values from said histogram which occur more often than other intensity values, and for generating mapping signals which are determinative of said respectively selected intensity values from said second set of intensity values to which subsets of the remaining intensity values from said first set are assigned; and mapping means coupled to said processing means and said display device for providing output signals to said display device during a second time period in response to second time period applied signals received during said second time period, said output signals having said second set of intensity values, the particular intensity value of each of said output signals being determined by said mapping signals.

7. The apparatus of claim 6 wherein said histogram generation means comprises:

a first random access memory having a data input, a data output, and an address input for receiving said first time period applied signals, said data output being coupled to said processing means; and accumulator means having an input coupled to the data output of said first random access memory, and having an output coupled to the data input of said first random access memory, for incrementing the signals provided by said first random access memory by a predetermined value and returning the incremented signals to said first random access memory for storage thereby.

8. The apparatus of claim 7 wherein said accumulator means comprises:

an adder having one input coupled to the data output of said first random access memory and having another input coupled to a signal source for providing said incremented value; and a latch having an input coupled to an output of said adder, and having an output coupled to the data input of said first random access memory.

9. The apparatus of claims 6, 7 or 8 wherein said processing means comprises:

a computer processing device programmed so as to determine said second set of intensity levels and for providing said mapping signals to said mapping means.

10. The apparatus of claim 6, 7, or 8 wherein said mapping means comprises:

a second random access memory having a data input, a data output and an address input for receiving said applied signals, said processing means having an output signal to said data input for providing said mapping signals thereto, said data output being coupled to said display device for providing said output signals thereto.

11. Apparatus for use with a display device which receives sequential fields of first video signals from a signal source, said first video signal having a first set of intensity values quantized into M levels, said apparatus providing second video signals to said display device during each video frame, said second video signals having a second set of intensity values quantized into N levels, said first set being larger than said second set, said apparatus comprising:

first means coupled to said signal source for providing third signals which are indicative of the number of occurrences of each of said M intensity levels of said first set for a field of data received during a first video frame;

second means coupled to said first means for processing said third signals during a second video frame, said second means including:

third set selection means for selecting a third set of intensity values from said third signals which comprise N levels which occur more often than the other levels;

fourth set selection means for selecting a fourth set of intensity values from said third signals which comprise levels which occur less often than the other levels, such that respective intensity values of said third set are interposed between adjacent intensity values of said fourth set; and first output signals comprising said third set of intensity values for each intensity value in said first set such that intensity values of said first set which are between adjacent values of said fourth set are assigned an intensity value of said third set interposed therebetween; and third means coupled to said signal source, said display device and said second means, for storing said first output signals received from said second means, and for processing said first video signals received from said signal source during a third video frame, to provide said second video signals to said display device, such that the intensity values associated with said second video signals are determined by the stored signals having said second set of intensity values associated therewith.

12. The apparatus of claim 11 wherein said first means comprises:

a first random access memory having a data input, a data ouput and an address input, said address input being coupled to said signal source for receiving said first video signals therefrom, said data output being coupled to said second means;

accumulator means having an input coupled to the data output of said first random access memory, and having an output coupled to the data input of said first random access memory, for incrementing the signals provided by said first random access memory by a predetermined value and returning the incremented signals to said first random access memory for storage thereby.

13. The apparatus of claim 12 wherein said accumulator means comprises:

an adder having one input coupled to the data output of said first random access memory and having another input coupled to a signal source for providing said incremented value; and a latch having an input coupled to an output of said adder, and having an output coupled to the data input of said first random access memory.

14. The apparatus of claims 11, 12 or 13 wherein said second means comprises:

a computer processing device programmed so as to determine said third and fourth set of intensity levels and for providing said first output signals to said third means.

15. The apparatus of claim 11, 12, or 13 wherein said third means comprises:

a second random access memory having a data input, a data output and an address input, said second means having an output coupled to the data input of said second random access memory for providing said first output signals thereto, the address input of said second random access memory being coupled to said signal source for receiving said first video signals, the data output of said second random access memory being coupled to said display device for providing said second output signals thereto.

* * * * *